United States Patent
Yu et al.

(10) Patent No.: US 12,549,702 B2
(45) Date of Patent: Feb. 10, 2026

(54) THREE-DIMENSIONAL STRUCTURED LIGHT CAMERA DEVICE HAVING A LIGHT SOURCE AND METHOD THEREFOR

(71) Applicant: NXP B.V., Eindhoven (NL)

(72) Inventors: Tian Yu, Wuhan (CN); Yuebin Wang, Jining (CN); Jianfeng Qin, Shanghai (CN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/909,357

(22) Filed: Oct. 8, 2024

(65) Prior Publication Data

US 2025/0126239 A1    Apr. 17, 2025

(30) Foreign Application Priority Data

Oct. 16, 2023   (CN) .......................... 202311338535.5

(51) Int. Cl.
*H04N 13/00* (2018.01)
*G06T 7/00* (2017.01)
(Continued)

(52) U.S. Cl.
CPC ........... *H04N 13/254* (2018.05); *G06T 7/514* (2017.01); *G06T 7/521* (2017.01); *G06T 2207/10028* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 9,454,821 B2 | 9/2016 | Ge et al. | |
| 2015/0371394 A1* | 12/2015 | Visentini | G01B 11/2513 382/154 |
| 2020/0319593 A1* | 10/2020 | Nam | G06T 7/0002 |

FOREIGN PATENT DOCUMENTS

CN        103268608 B       12/2015

OTHER PUBLICATIONS

Bai Yichuan et al: "An Efficient High-Throughput Structured-Light Depth Engine", IEEE Transactions on Very Large Scale Integration (VLSI) Systems, IEEE Service Center, Piscataway, NJ, USA, vol. 30, No. 8, Aug. 1, 2022, pp. 1047-1058, XP011915195, ISSN: 1063-8210, DOI: 10.1109/TVLSI.2022.3171854.
(Continued)

*Primary Examiner* — Zhihan Zhou

(57) ABSTRACT

A three-dimensional structured light camera device includes a LUT memory and a processor configured to perform object detection and identify a 3D object area of interest of a target speckle image and perform a local adaptive binarization process that searches the LUT memory for speckle features of a stored reference speckle image and matches speckle features of the target speckle image with the searched speckle features of the reference speckle image. In some examples, the processor may perform a morphological operation on matched speckle features of the target speckle image that generates a noise-reduced target speckle image; and perform binary encoding compression. A depth value calculation of the 3D target object is performed in response to the binary encoding compression performed on the noise-reduced target speckle image. In this manner, speckle matching can be accelerated with a lower number of calculations.

13 Claims, 9 Drawing Sheets

(51) Int. Cl.
  *G06T 7/514*   (2017.01)
  *G06T 7/521*   (2017.01)
  *H04N 13/254*  (2018.01)

(56)      References Cited

OTHER PUBLICATIONS

Gu Jiawei: "A Semi-Dense Depth Map Acquisition Algorithm Based on Laser Speckle", Chinese Journal of Lasers, vol. 47, No. 3.Mar. 1, 2020 (Mar. 1, 2020), pp. 1-9, XP093154693, CN ISSN: 0258-7025, DOI: 10.3788/CJL202047.0304004.

Kun Liu et al: "Optimized stereo matching in binocular three-dimensional measurement system using structured light", Applied Optics, Optical Society of America, Washington, DC, US, vol. 53, No. 26, Sep. 10, 2014, pp. 6083-6090, XP001591905, ISSN: 0003-6935, DOI: 10.1364/AO.53.006083.

Pan et al.: "Depth extraction method with subpixel matching for light-coding-based depth camera", IET Image Processing, IET, UK, vol. 12, No. 10, Oct. 1, 2018, pp. 1703-1712, XP006069560, ISSN: 1751-9659, DOI: 10.1049/IET-IPR.2016.0567.

* cited by examiner

```
uint8_t q7_count1_table[256] = {
    0, 1, 1, 2, 1, 2, 2, 3, 1, 2, 2, 3, 2, 3, 3, 4,
    1, 2, 2, 3, 2, 3, 3, 4, 2, 3, 3, 4, 3, 4, 4, 5,
    1, 2, 2, 3, 2, 3, 3, 4, 2, 3, 3, 4, 3, 4, 4, 5,
    2, 3, 3, 4, 3, 4, 4, 5, 3, 4, 4, 5, 4, 5, 5, 6,
    1, 2, 2, 3, 2, 3, 3, 4, 2, 3, 3, 4, 3, 4, 4, 5,
    2, 3, 3, 4, 3, 4, 4, 5, 3, 4, 4, 5, 4, 5, 5, 6,
    2, 3, 3, 4, 3, 4, 4, 5, 3, 4, 4, 5, 4, 5, 5, 6,
    3, 4, 4, 5, 4, 5, 5, 6, 4, 5, 5, 6, 5, 6, 6, 7,
    1, 2, 2, 3, 2, 3, 3, 4, 2, 3, 3, 4, 3, 4, 4, 5,
    2, 3, 3, 4, 3, 4, 4, 5, 3, 4, 4, 5, 4, 5, 5, 6,
    2, 3, 3, 4, 3, 4, 4, 5, 3, 4, 4, 5, 4, 5, 5, 6,
    3, 4, 4, 5, 4, 5, 5, 6, 4, 5, 5, 6, 5, 6, 6, 7,
    2, 3, 3, 4, 3, 4, 4, 5, 3, 4, 4, 5, 4, 5, 5, 6,
    3, 4, 4, 5, 4, 5, 5, 6, 4, 5, 5, 6, 5, 6, 6, 7,
    3, 4, 4, 5, 4, 5, 5, 6, 4, 5, 5, 6, 5, 6, 6, 7,
    4, 5, 5, 6, 5, 6, 6, 7, 5, 6, 6, 7, 6, 7, 7, 8,
};
```

FIG. 7

THREE-DIMENSIONAL STRUCTURED LIGHT CAMERA DEVICE HAVING A LIGHT SOURCE AND METHOD THEREFOR

CROSS-REFERENCE TO RELATED APPLICATIONS

This application claims the priority under 35 U.S.C. § 119 of China application no. 202311338535.5, filed on 16 Oct. 2023, the contents of which are incorporated by reference herein.

FIELD OF THE INVENTION

The field of the invention relates to a three dimensional (3D) structured light camera device having a light source and a method for processing depth information using speckle depth value calculations used for 3D modelling of a target object.

BACKGROUND

In recent years, three dimensional (3D) structured light cameras have become more popular and are now widely used in various intelligent products, such as mobile phones, robots, smart homes, smart security, vehicles and other fields. A 3D structured light camera is sometimes also referred to as a 'depth camera', which is different from standard cameras. A 3D structured light camera differs from a 3D light camera in that a special speckle pattern is projected onto the object. This kind of speckle pattern is pseudo-random, and each speckle distributed in space has a unique code, which can be used for speckle identification, so as to realize depth ranging. In addition to capturing the two-dimensional picture information, a 3D structured light camera also obtains a third-dimensional distance information, typically through a speckle depth decoding algorithm that can be used for 3D modelling of a target. In this context, a speckle is considered to be a small mark, spot or patch of colour in an image.

FIG. 1 illustrates a simplified known diagram 100 of a 3D structured light camera 110 arrangement, configured to take a picture of a 3D object 130. The 3D structured light camera 110 includes a speckle emitter 120, an infrared (IR) light emitting diode (LED) 122 and an IR camera 124. The IR camera 124 has only one whole reference speckle image, which is stored in a camera memory by the camera supplier from the beginning. Projecting a narrow band of light onto a three-dimensionally shaped surface produces lines of illumination that appears distorted from other perspectives than that of the projector and can be used for geometric reconstruction of the surface shape. The projection approach typically uses incoherent light and basically works like a video projector. Patterns are usually generated by passing light through, say, a digital spatial light modulator, typically based on one of the three currently most widespread digital projection technologies: transmissive liquid crystal, reflective liquid crystal on silicon (LCOS) or digital light processing (DLP; moving micro mirror) modulators.

FIG. 2 illustrates a known arrangement 200 provided by module manufacturers that includes an embedded application-specific integrated circuit (ASIC) designed to include a depth decoding algorithm in the camera module. The known arrangement 200 includes a 3D structured light camera 110 with an extra embedded application specific integrated circuit (ASIC) configured to generate an IR and depth frame 210 and a 3D structured light camera 110 without an extra embedded ASIC configured to generate an IR and speckle frame 230. The IR and depth frame 210 is provided to a main computer unit (MCU) system on chip (SOC) 220 that is configured to run a vision algorithm 222 from a library of algorithms. The IR and speckle frame 230 is provided to a main computer unit (MCU) system on chip (SOC) 240 that is configured to run a vision algorithm 242 and a depth decoding algorithm 244 from a library of algorithms. The primary goal of these two paths is to obtain IR and depth images of a target. For the IR and depth frame 210 path (110-210-220), the IR and depth images of a target can be obtained directly through the object detection algorithm of the vision algorithm 222. For the IR and speckle frame 230 path (110-230-240), only the IR and speckle images of the target can be obtained through the object detection algorithm 242, then the process still needs to use the depth decoding algorithm to obtain the target depth image. The known arrangement 200 then provides an output 250 of the IR and depth images of the target, which may be used in many 3D solutions, such as 3D modelling, anti-spoofing, object positioning, volume measurement, AR/VR, etc.

Depth estimation based on a 3D structured light laser speckle camera is an active three-dimensional depth measurement method. It is known that the speckle structure has two characteristics that provide conditions for depth measurement. A first characteristic is that speckle points are with strong autocorrelation and weak correlation, which means each speckle is distinguishable. A second characteristic is that the speckle structure has translation invariance, which means the speckle pattern is moving as a whole at different distances in an ideal speckle structured light system so that the speckle size and distribution will not change along with the distance. Most of the existing depth decoding algorithms make depth estimation of every pixel of each frame indiscriminately. Moreover, these algorithms do not optimize and accelerate the process of speckle matching, so they inherently require/incur a large number of calculations. Hence, module manufacturers embed an application-specific integrated circuit (ASIC) designed specifically to run a depth decoding algorithm within the camera module. However, the extra ASIC leads to problems of high-power consumption and, thus, higher cost of 3D structured light cameras, which discourages customers who prefer to use 3D structured light cameras but where they are sensitive to the price.

A paper authored by Gu Jiawei, Xie Xiaopeng, Cao Yibo, Liu Haoxin, titled 'A Semi-Dense Depth Map Acquisition Algorithm Based on Laser Speckle[J]' and published in the Chinese Journal of Lasers, 2020, 47(3): 0304004 describes a speckle extraction approach that uses local adaptive binarization processing. The present inventors have also recognised and appreciated that the approach adopted in this paper proposes to compress memory by sacrificing resolution of speckle image, and consequently the matching accuracy cannot reach pixel-level. Other known technologies have restrictions on supported platforms. The inventors have recognized and appreciated that it would be useful to design an approach that could be independent of an ASIC architecture and run on a main computer unit (MCU) platform, together with in some instances suitable artificial intelligence (AI)/machine language (ML) algorithms, to make the approach cost-effective. The inventors have also recognized and appreciated that it would be useful to design an approach that balances accuracy, speed and computing efficiency with regard to memory usage. Accordingly, there is a need for a device having a light source and a method for performing a depth value calculation.

SUMMARY

Examples herein described provide a 3D structured light camera device having a light source and a method for performing a depth value calculation, as described in the accompanying claims. Specific embodiments are set forth in the dependent claims. These and other aspects will be apparent from and elucidated with reference to the embodiments described hereinafter.

BRIEF DESCRIPTION OF THE DRAWINGS

Further details, aspects and embodiments will be described, by way of example only, with reference to the drawings. In the drawings, like reference numbers are used to identify like or functionally similar elements. Elements in the figures are illustrated for simplicity and clarity and have not necessarily been drawn to scale.

FIG. 7 illustrates one example of a table representing for a 'number of bits being '1' in an 8-bit binary value', according to some examples.

DETAILED DESCRIPTION

Figure 1:
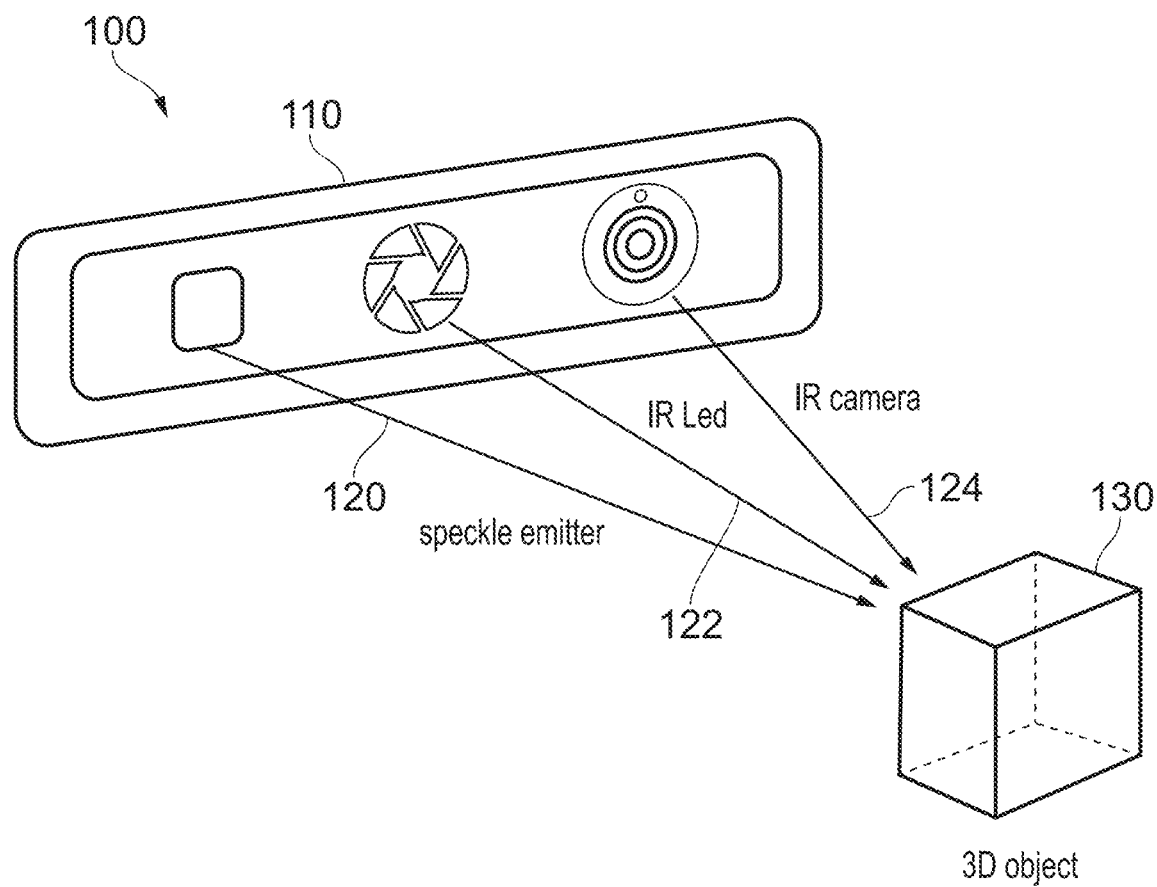
FIG. 1 illustrates a simplified known drawing of a 3D structured light camera.
Figure 2:
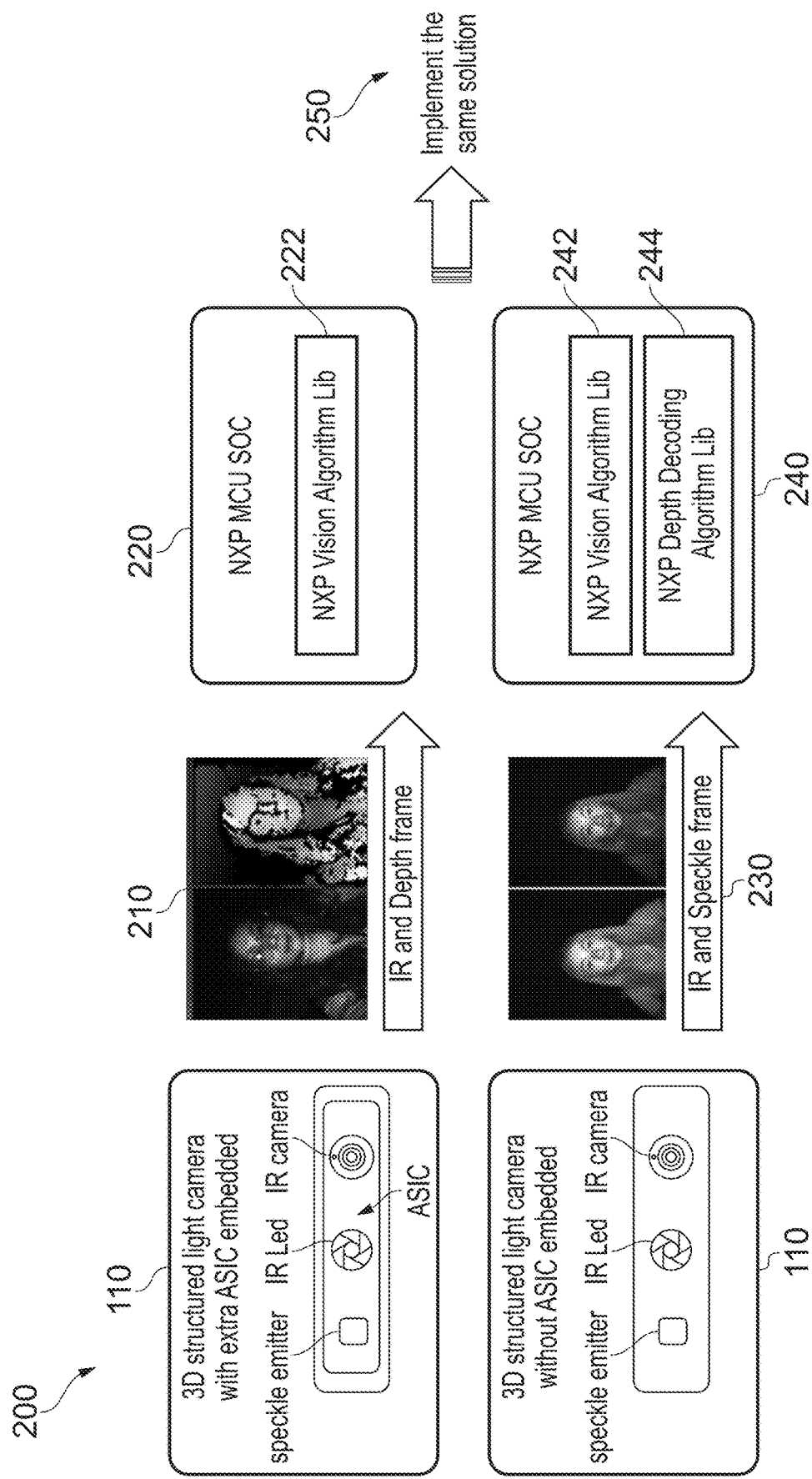
FIG. 2 illustrates a known arrangement provided by module manufacturers that includes an embedded application-specific integrated circuit (ASIC) designed to include a depth decoding algorithm in the camera module.

Examples herein described propose a device having a light source and a method for performing a depth value calculation that is highly-efficient and cost-effective, based on infrared speckle images of 3D structured light cameras. One aspect of the proposed approach is configured to adaptively process a target region of interest according to requirements of the depth value calculation, which avoids a large amount of computing resources being wasted on invalid regions or regions where there are no-target frames of interest. It is noted that adaptively processing a target region of interest is a new operation for depth decoding, particularly for application scenarios with specific goals. In some examples, the specific goals may be to process the interested objects of the application, such as a face recognition's goal is to process face, gesture recognition and a tracking goal is to process, say, hand, person detection body, and so on. Examples herein described then propose a local adaptive binarization processing of a reference speckle image and a target speckle image to extract complete and clear speckle features and perform binary encoding compression that provides a saving of computing resources. Thereafter performing a morphological operation on the target speckle image removes noise points, thereby ensuring accuracy when extracting speckle features as the data after noise removal will obtain higher speckle matching accuracy.

Some examples herein described also propose that the memory space required for depth value calculations and processing may be compressed by, say, up to 8 times using binary encoding. Under a premise of ensuring that the accuracy of depth parallax information is not reduced, the speckle matching calculation between the reference speckle image and the target speckle image may be optimized and accelerated by, say, more than 12 times through a use of an efficient search strategy and Look-Up-Table (LUT) method. Some examples herein described also propose, for long-distance objects, Sub-Pixel-Level (SPL) processing, which may be provided to further improve 2 times precision of depth estimation. Finally, in some examples herein described, the actual depth distance value may be calculated according to the speckle projection principle of 3D structured light. In this manner, some examples herein described require no extra embedded chip (e.g., an application specific integrated circuit (ASIC)) that is dedicated specifically for applying a depth decoding algorithm, thereby helping to reduce cost.

In contrast to the teaching during speckle extraction in 'A Semi-Dense Depth Map Acquisition Algorithm Based on Laser Speckle[J]', to only use local adaptive binarization processing, examples herein described adopt morphological operations to remove noise points after local adaptive binarization processing. Furthermore, in contrast to the teaching in 'A Semi-Dense Depth Map Acquisition Algorithm Based on Laser Speckle[J]' to compress memory by sacrificing resolution of speckle image. In contrast, examples herein described adopt a compression and optimization technique that compresses the space by 8 times without loss of any original information or sacrificing speckle image resolution. Examples herein described also optimize the data storage and enables the matching accuracy to reach pixel-level and provides optimization accuracy for long-distance data.

A first aspect herein described provides a three-dimensional, 3D, structured light camera device for processing and depth value calculation comprising: an infrared, IR, emitting light source configured to illuminate a three-dimensional, 3D, target object, a speckle emitter, and an IR camera. A look-up table, LUT, memory is configured to store a reference speckle image of the 3D target object; and a processor is operably coupled to the light source and the LUT memory and configured to: perform object detection on a target speckle image; identify a 3D target object area of interest of the target speckle image; perform a local adaptive binarization process that searches the LUT memory for speckle features of the stored the reference speckle image and match speckle features of the target speckle image with the searched speckle features of the stored the reference speckle image; find the matched speckle features of the target speckle image; perform a morphological operation on the matched speckle features of the target speckle image that generates a noise-reduced target speckle image; perform binary encoding compression on the noise-reduced target speckle image; and perform a depth value calculation of the 3D target object in response to the binary encoding compression performed on the noise-reduced target speckle image.

In this manner, examples herein described may optimize and accelerate the process of speckle matching, with a relatively lower number of calculations, by adaptively extracting an area of interest of the object and then using an efficient search strategy with a Look-Up-Table. Furthermore, module manufacturers may embed an application-specific integrated circuit (ASIC) designed specifically to run a depth decoding algorithm within the camera module with lower power consumption and, thus, lower cost of 3D structured light cameras. In particular, examples herein described may perform pre-processing using local adaptive binarization and morphological operations to extract complete and clear speckle features.

In some examples, the processor may perform binary encoding compression on the noise-reduced target speckle image, which may include the processor being configured to compress image of eight pixels into one byte of image data. In this manner, the binary encoding compression stores eight pixels in one byte without losing the information for speckle matching. In some examples, the Look-Up-Table memory may be configured to store at least one byte of image data of eight pixel speckle features of the stored the reference speckle image. In this manner, the use of an LUT decreases the computation complexity of the matching process. In some examples, the processor may be configured to match at least one byte of speckle features of the target speckle image with the searched speckle features of the stored reference speckle image. In this manner, the storing of image data and the searching strategy may be more easily performed.

In some examples, the processor may be configured to perform object detection on a target speckle image, which may include the processor being configured to obtain one or more coordinate parameter(s) of a target bounding box from which the processor is configured to adaptively extract the 3D target object area of interest to process. In this manner, the processor may target the speckle features of interest, rather than obtain speckle features from a whole object area that includes a number of speckles that are not of interest (and thereby waste valuable processing resources).

In some examples, the processor may be configured to convert a target speckle image and the reference speckle image from a raw red-green-blue, RGB, speckle image to a single-channel greyscale speckle image with a pixel value range between '0' to '255'.

In some examples, the processor may be configured to first train a speckle decoding process for a camera image by first being configured to create the reference speckle image to be matched to an object speckle image. In the context of the examples herein described, the expression 'speckle decoding process' encompasses decoding speckle information of a target object/image into depth information, whereby speckle matching is considered to be one part of speckle decoding process.

In some examples, the processor may be configured to convert the target speckle image and the reference speckle image from a raw red-green-blue, RGB, speckle image to a single-channel greyscale speckle image with a pixel value range between '0' to '255'. In some examples, the processor may be configured to separate background information and speckle points of the target speckle image. In some examples, the processor may be configured to compare and filter the target speckle image using a threshold that is applied within a set window size. In some examples, the processor may be configured to first train the speckle decoding process for a camera image by first being configured to create the reference speckle image.

The reference speckle frame 320 has only one image from the beginning. In some examples, the whole reference speckle image that is originally stored in a camera memory by the camera supplier is replaced by the processed whole reference speckle image 330 after local adaptive binarization, morphological operation and/or binary encoding compression.

In some examples, an integrated circuit for a 3D structured light camera device comprises the above processor.

A second aspect herein described discloses a method for performing a depth value calculation in a three-dimensional, 3D, structured light camera device. The method comprises: illuminating a three-dimensional, 3D, target object, storing a reference speckle image of the 3D target object; performing object detection on a target speckle image of the 3D target object; identifying a 3D target object area of interest of the target speckle image; performing a local adaptive binarization process comprising searching a look-up table, LUT, memory for speckle features of the stored reference speckle image and matching speckle features of the target speckle image with the searched speckle features of the stored reference speckle image; finding the matched speckle features of the target speckle image; performing a morphological operation on the matched speckle features of the target speckle image that generates a noise-reduced target speckle image; performing binary encoding compression on the noise-reduced target speckle image; and performing a depth value calculation of the 3D target object in response to the binary encoding compression performed on the noise-reduced target speckle image.

In this manner, an improved way of performing a depth value calculation may be achieved, e.g., requiring less computation, less storage, etc., Thereafter, the depth calculation value may subsequently be used for a range of applications, for example, the depth calculation value can be combined with two-dimensional (2D) information in order to perform 3D modelling. The depth calculation value may be used in the field of face recognition, where a 3D face is not affected by natural lighting. This approach can achieve perfect segmentation even if the foreground and background colours are similar, and its performance under complex head postures is far better than purely using a 2D face. Meanwhile, 3D face recognition is a truly secure face recognition that can effectively avoid security attacks, such as photos/ screen pictures, face-changing algorithms, wearing masks/ 3D face models, etc. Furthermore, it is envisaged that the depth calculation value may be very suitable for anti-spoofing. In addition, it is envisaged that depth values can also be used in a variety of applications, such as intelligent human-computer interaction, three-dimensional reconstruction, and autonomous robot navigation.

Figure 3:
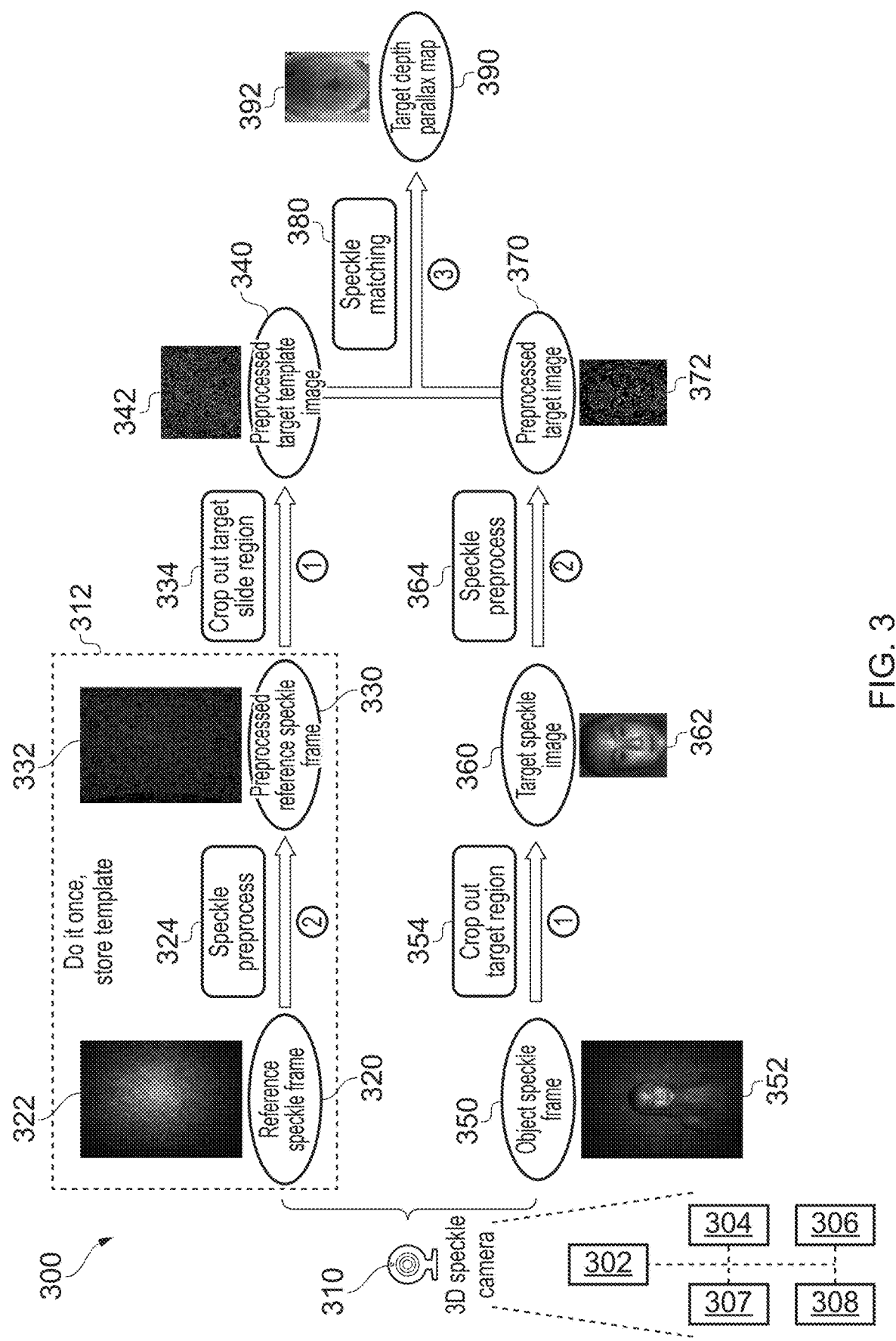
FIG. 3 illustrates one example of an information flow of a depth value calculation, according to some examples.

FIG. 3 illustrates one example of speckle structure depth estimation 300 employed by a 3D structured light speckle camera 310, according to some examples. The 3D structured light speckle camera 310 includes a speckle emitter 302, an infrared (IR) light emitting diode (LED) 304, a processor 306, a look-up table (LUT) memory 307 and an IR camera 308. In accordance with some examples, the depth estimation 300 employed by the processor 306 in the 3D structured light speckle camera 310 is configured to adaptively extract and process only an interested (smaller) target area from obtained 3D depth information, in contrast to known depth decoding algorithms that process all depth information that generate depth estimation of every pixel of each frame indiscriminately, irrespective of the computing resources that may be wasted on many invalid regions and no-target frames.

In the depth estimation 300, a first operation is to train 312 the speckle decoding process, for example once, by a processor in the 3D structured light speckle camera 310 referencing a speckle frame 322 at 320. The reference speckle frame is captured based on a white and clean background without a 3D target object. In some examples, the speckle distribution on the reference speckle frame will be used as a standard to be compared with the target speckle frame. If there are 3D objects, the speckle spots of the objects in the target speckle image will be offset relative to the standard. Thereafter, a speckle pre-process operation is performed at 324. Here, the speckle pre-process operation is configured to extract and compress the speckle features, which in some examples includes the operations of one or more of: local adaptive binarization, morphological operation, binary encoding compression, in order to obtain a pre-processed reference speckle frame 332 at 330. Thereafter, at 334, a target slide region of the pre-processed reference speckle frame 332 is cropped out in order to obtain a pre-processed target template image 342 at 340. In a context of examples herein described, a pre-processed target template image encompasses a target-related reference speckle image with speckle feature extraction and binary encoding compression. In a context of examples herein described, a reference speckle frame is provided by a 3D camera supplier, and a reference speckle image encompasses a target-related reference speckle image, which may be cropped from reference speckle frame according to target coordinates.

Once the training operation has been performed, an object speckle frame 352 is received at 350. At 354, a target region of the object speckle frame 352 is extracted/cropped out in order to obtain a target speckle image 362 at 360. At this point, a speckle pre-process operation is performed at 364. As shown in FIG. 3, the reference speckle frame is known from the beginning and will not change, so in some examples it is processed first. If a target is detected, then the target is cropped from the pre-processed reference speckle frame in order to obtain the target-related reference speckle image after preprocessing. Here, in this example, a speckle pre-processing operation is only performed for the object speckle frame, in order to obtain a pre-processed target image 372 at 370. Furthermore, the processor 306 of the IR camera 308 replaces the whole original reference speckle image that is stored in the IR camera 308 memory by the camera supplier with the processed whole reference speckle image after local adaptive binarization, morphological operation and/or binary encoding compression. Thereafter, at 380, a speckle matching process is performed to obtain a target depth parallax map 392 at 390. Thus, flowchart 300 includes two pipelines, a first pipeline is focused on obtaining target-related reference speckle image after preprocessing, and only performing this once for each camera, and a second pipeline is focused on obtaining target object speckle image after preprocessing when the target is detected, then performing speckle matching on them. Speckle matching will help each pixel on the target speckle image to find the matching reference pixel position. Finally, the depth parallax map of a target object may be obtained.

It is envisaged that in some examples the processor 306 may be employed in an integrated circuit for a 3D structured light camera device. Although one example is described with regard to using a training operation to obtain a pre-processed reference speckle frame 332, it is envisaged that in other examples the reference speckle image may be pre-loaded or separately received.

Adaptively Extracting the Area of Interest

Figure 4:
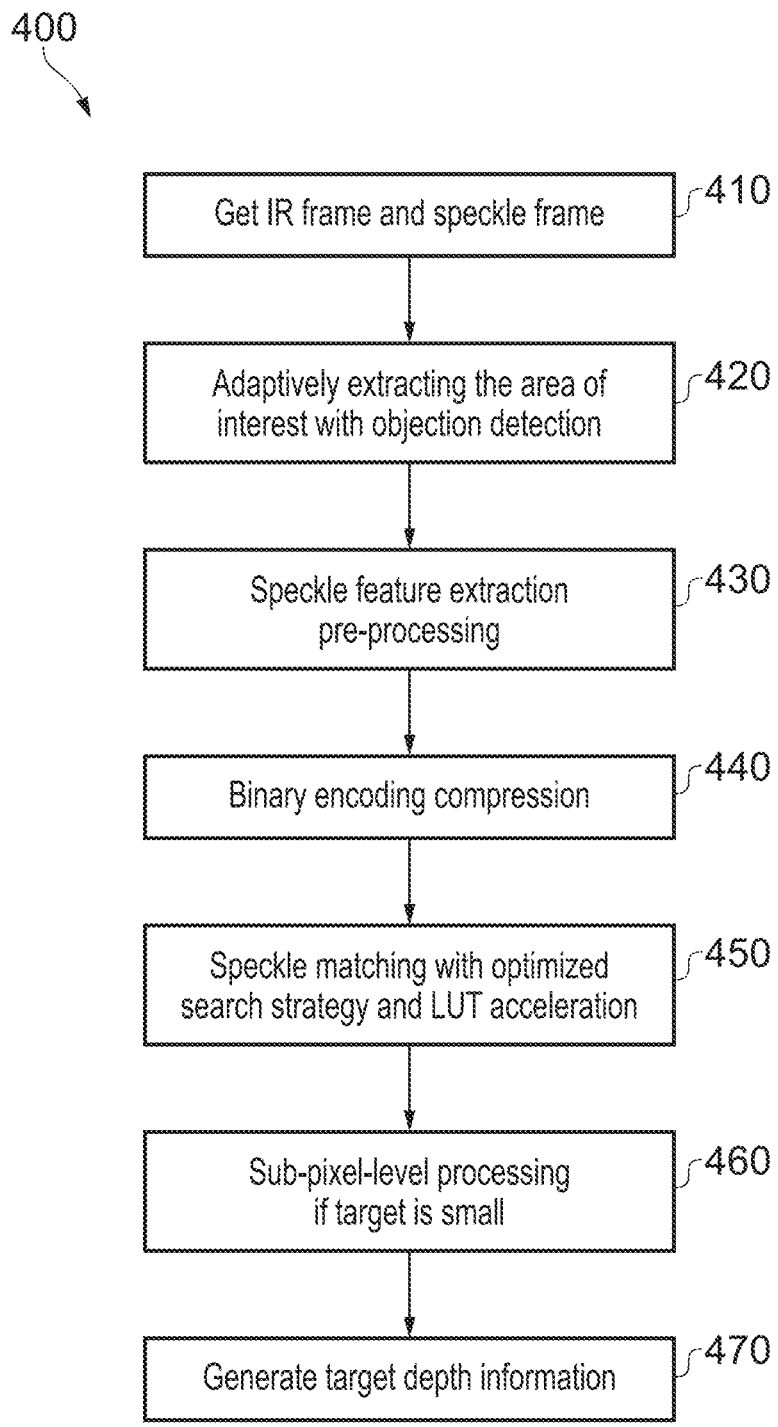
FIG. 4 illustrates one example of a high-level flowchart for a depth value calculation, according to some examples.

Referring now to FIG. 4, one example of a high-level flowchart for depth estimation/decoding 400 is illustrated, according to some examples. At 410, a processor (such as processor 306 in FIG. 3) obtains or receives an IR frame and a speckle frame, for example in accordance with the operation of the 3D structured light speckle camera 310 in FIG. 3. Depth estimation based on a 3D structured light speckle camera is an active three-dimensional depth measurement method. It is known that the speckle image structure has two characteristics that provide conditions for depth measurement. A first characteristic is that speckle points exhibit both strong autocorrelation and weak correlation, which means each speckle is distinguishable. A second characteristic is that the speckle structure has translation invariance, which means the speckle pattern is moving as a whole at different distances in an ideal speckle structured light system, such that the speckle size and distribution will not change according to the distance.

Speckle Feature Extraction Pre-Processing and Binary Encoding Compression

In accordance with some examples, and since a reference speckle image is pre-stored at 312 of FIG. 3 in one example, its ambient brightness and background information are different from the target speckle images 362 captured in real time. To ensure the matching accuracy of the reference speckle and target speckle, in accordance with examples herein described, the interference information is removed so that a complete and clear speckle feature image can be extracted.

Thus, at 420, the flowchart for depth estimation/decoding 400 then adaptively extracts an area of interest with object detection. In one example, a 3D structured light speckle camera will alternately output the pure infrared image and infrared speckle image projected with a laser speckle. When obtaining the pure infrared image and infrared speckle image, an object detection algorithm may first be employed on the pure infrared image to obtain the coordinates of the target bounding box. In examples herein described, the pure infrared frame is captured by IR camera without projecting a speckle pattern. A laser speckle is the speckle pattern projected by the speckle emitter. For example, a processor (such as processor 306 in FIG. 3) or an algorithm employed by the processor may be configured to provide an input interface of, say, one or more coordinate parameter(s), which can adaptively crop out/extract a region of interest for processing, for example according to any product requirements. Thus, at 430, a speckle feature extraction pre-processing operation is performed, for example, by local adaptive binarization and morphological operations, and binary encoding compression at 440 in order to obtain complete and clear speckle features.

First, in one example of 430 and 440, the original speckle image may be received as, or converted to, greyscale, so that the raw RGB (red-green-blue) speckle image is changed into a single-channel greyscale speckle image with a pixel value range between 0~255. Second, a local adaptive binarization processing approach is adopted to separate the background information and speckle points. In examples herein described, local adaptive binarization encompasses determining a binarization threshold at the pixel position based on the pixel value distribution of the domain block of the pixel. In this manner, it does not matter if the brightness of the entire frame is uneven, as it may be configured to, say, compare and filter by a threshold that is applied within a set window size (see equations [1], [2]):

$$I'(x, y) = \begin{cases} 0, & I(x, y) < T(x, y) \\ 1, & I(x, y) \geq T(x, y) \end{cases} \quad [1]$$

-continued $$T(x, y) = \frac{1}{(2r+1)^2} \sum_{m=-r}^{r} \sum_{n=-r}^{r} I(x+m, y+n) \quad [2]$$

Where:
I(x, y) indicates the grey value of any pixel in the original image;
I'(x, y) is the pixel value after local adaptive binarization;
T(x, y) is the local adaptive binarization threshold, which may be obtained by the average value of a plurality of pixels in the window with the grey pixel value I(x, y) as the center and r as the radius.

As indicated by the above equations, the binarization result of each pixel is calculated in the window that is centred on it. Compared with global binarization, the adopted local binarization may also find differences in the window even if this window is too dark or too bright in the whole image, such that speckle features in areas that are too bright or too dark can still be reserved. Consequently, if there are some areas that are deemed too bright or too dark under the influence of the background, their speckle points may still be distinguished from the surrounding environmental pixels in the local range. This processing facilitates an extraction of a complete binarized image of the speckle features.

As each individual speckle point is composed of several pixels connected, the binarized speckle image will inevitably retain some of the brighter and smaller areas of the non-speckle, in which the small areas are considered as ambient noise. Therefore, in accordance with some examples and in order to obtain clean and clear speckles, a morphological open operation is performed, which is a known technique in general image processing but has not been adopted in a depth decoding task until the examples described herein. A known definition of a morphological opening of an image is an erosion followed by a dilation, using the same structuring element for both operations. In some implementations, it is possible to combine dilation and erosion in order to remove/filter out these ambient noises in a form of small objects from an image and smooth a border of large objects. Thus, in some examples and in accordance with such an erosion and expansion operation, examples herein described set a reasonable kernel size to substantially retain the speckle points (e.g., without significantly changing the size of speckle points) and remove the noise.

Figure 5:
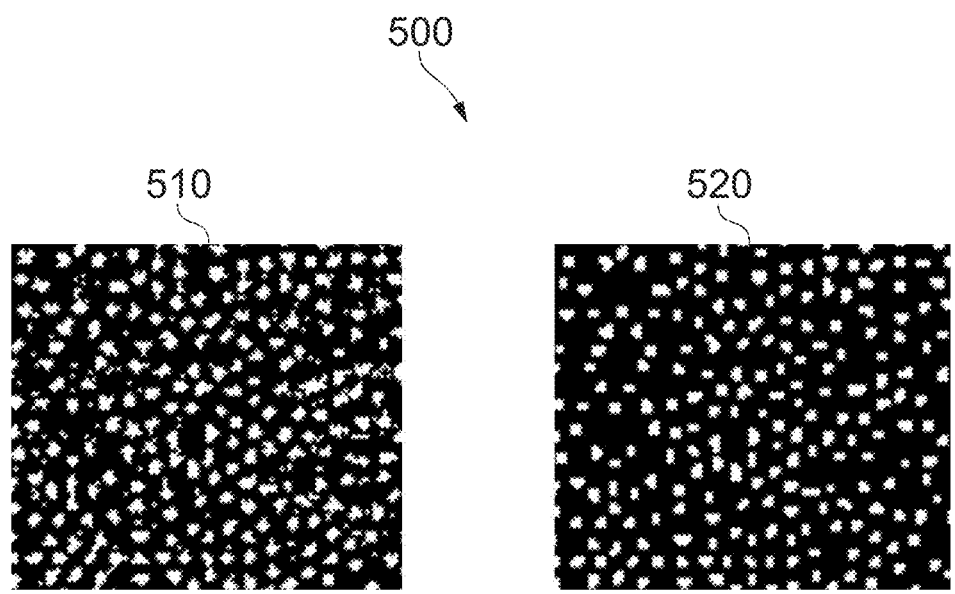
FIG. 5 illustrates one example image area after local adaptive binarization and an image area after morphological open operation that removes small noise data of binarized image, according to some examples.

Referring now to FIG. 5, one example of a selected image area 500 is illustrated, with a non-processed image shown at 510 and the pre-processed image 520 shown after local adaptive binarization and after morphological open operation that removes small noise data of binarized image, according to some examples described herein. Currently known techniques do not apply any concept of local adaptive binarization and morphological open operation that removes small noise data of a binarized image. In some examples, a morphological opening of an image layer of a speckle pre-processing operation encompasses the binarized speckle image being eroded and then dilated, so as to filter out these ambient noises without significantly changing the size of speckle points. In known existing depth decoding algorithms, this additional layer of speckle pre-processing is not contemplated. However, the inventors have recognised that a cleaner speckle image, together with a more complete set of data is very important for the accuracy of the subsequent depth decoding.

In this manner, a corresponding infrared speckle image and related matching area on the reference speckle pre-processed image may be cropped out/extracted. Furthermore, in this example, there is neither a need to process a non-target area, nor any need to process each frame when the target is not detected. In some examples, in order to help a depth decoding algorithm focus on a selected area in order to save processing time and memory, the focus on a selected area may be able to significantly reduce power consumption and save computing resources.

Referring back to FIG. 4, at 450, a speckle matching and optimization acceleration process is employed, for example using an efficient search strategy and Look-Up-Table. In examples herein described, optimization acceleration refers to a use of the LUT for a similarity calculation of speckle features, and the use of effective searching strategy, which adds conditional judgment (see, for example, FIG. 8. at 822, 826). Once the feature has been extracted before speckle matching, the process only needs to find the reference speckle features of a target speckle image having the highest similarity. At 460, in this example, a sub-pixel-level processing is performed, for example in order to improve depth estimation/decoding accuracy of long-distance targets. Thereafter, the target depth information may be generated at 470. The target depth information generated at 470 is sometimes referred to as a depth parallax map, which can be obtained by calculating a row direction translation relationship between an object speckle image and reference speckle image. Thereafter, the actual distance value ('depth information') may be derived through the principle of triangulation, as is known.

In particular, in this manner and in contrast to known approaches, a combination of the binary encoding compression and the efficient speckle matching with the Look-Up-Table searching approach provides a highly-efficient and low-memory-cost algorithm, running on a processor (such as processor 306 in FIG. 3), to obtain accurate target depth information for 3D-related applications. In some examples, the binary encoding compression may be configured to store, say, 8 pixels in 1 byte without losing the information for speckle matching. Meanwhile adopting a Look-Up-Table searching approach may be configured to decrease computation complexity of the matching similarity, particularly when the 8 pixels' worth of information is stored in 1 byte. Otherwise, the processor may be configured to split an 8-bit data into separate bits in order to calculate a matching similarity.

In this manner, examples herein described are able to improve a performance of a processing of speckle images without substantial compression of the memory usage, without needing to incorporate complex computations and avoiding significantly sacrificing the speckle image resolution, as identified in known approaches.

In addition, some examples herein described may also use a characteristic of binary encoding to represent the pixel values of the binarized speckle image obtained above with a '0' or '1', and encodes the value of 8 pixels into an 8-bit integer value. In this manner in some examples, the image, whose original size is Height×Width bytes, requires only Height×Width/8 bytes of storage. Meanwhile, the subsequent matching similarity calculations can also be processed in parallel with 8 pixels in order to help improve a computing efficiency. It is noted that the example binary encoding approach is different from the approach and goals of known techniques. For example, following local adaptive binarization processing (unlike known techniques), some examples described herein are able to store 8 bits in a byte-limited fashion using the compression and encoding methods. Specifically, the target of known techniques is to represent a single speckle point with a single pixel by extracting the centre of the speckle point. Generally, each speckle point is composed of more than '5' or '6' pixels. Then the known techniques use a convolution process to compress the data storage. Thus, the operation of putting '8' pixels in a byte is not suitable for the compression and encoding methods of known techniques. Furthermore, some known techniques compress the data storage, but concurrently the technique sacrifices resolution of the speckle image so that their matching accuracy cannot reach pixel-level.

Although examples herein described propose to use 8-bit encoding compression, as it not only compresses space without accuracy loss but also provides conditions for acceleration of subsequent speckle matching without accuracy loss, it is envisaged that other bit encoding compression rates could be adopted, albeit that they may be less efficient, e.g., 4-bit or 16-bit. For example, a 4-bit compression would not be as efficient as 8-bit compression, which only compresses four times the memory. Also, a 16-bit compression may also not be an ideal compression scheme for storage, for example leading to a low table lookup efficiency, and/or a LUT also taking up more memory space.

As illustrated in FIG. 5, following the above processing, the original infrared speckle image 510 has been successfully converted into a clean and clear speckle binarized image 520 with an 8-fold smaller memory size. For the reference speckle image, the pre-processing operation is only required in its initialization stage, then it is replaced by the pre-processed reference speckle image. Thereafter, for object speckle images, only the specified target area needs to be processed in order to derive the corresponding depth information. Due to the fact that the reference speckle frame is known from the beginning and will not change, it is possible to process it first. Thereafter, if a target is detected, then in accordance with examples herein described, the process only needs to crop from the pre-processed reference speckle frame in order to obtain the target-related reference speckle image after preprocessing. The object speckle images always changes, so the target speckle needs to be cropped and a speckle pre-process operation performed every time.

Speckle Matching and Optimization Acceleration

Figure 6:
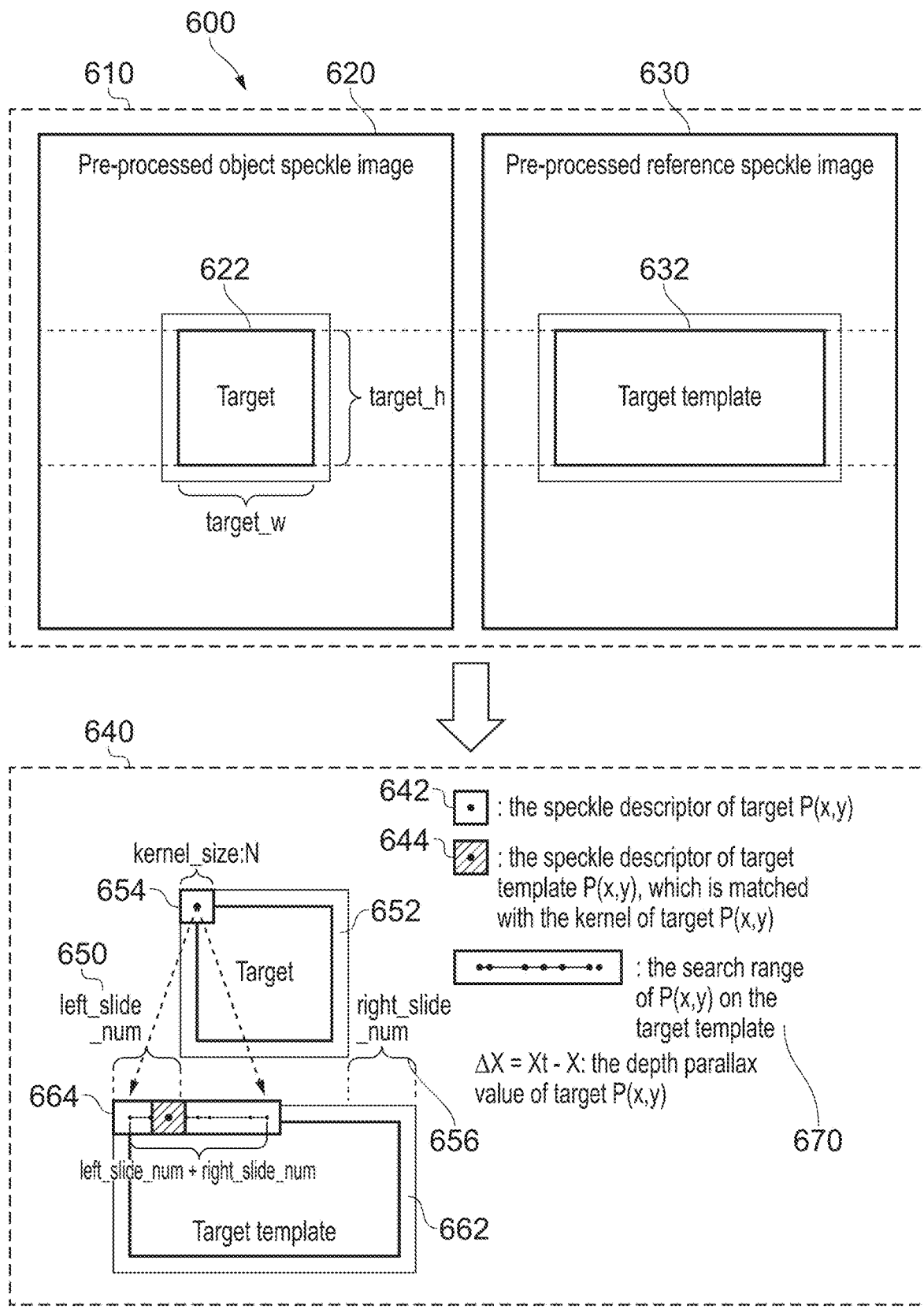
FIG. 6 illustrates one example schematic of a speckle matching process, according to some examples.

Referring now to FIG. 6, one example schematic of a speckle matching process 600 is illustrated according to some examples. The existing process 610 that uses a pre-processed object speckle image 620 with a target speckle image 622 and a pre-processed reference speckle image 630 with a target template 632 is improved. Once the feature has been extracted before speckle matching, the process only needs to find the reference speckle features of a target speckle image having the highest similarity. In this example an efficient search strategy is employed in order to reduce the matching cost, wherein the search strategy utilizes a Look-Up-Table (LUT) approach in order to accelerate a 'similarity' calculation of speckle matching. Therefore, in this manner, a target speckle image and the reference speckle image after pre-processing may be matched rapidly and accurately. Thereafter, the depth parallax information of the target speckle image can be derived.

It is known that it is currently very difficult to find a matching pixel for each single pixel. Therefore, in order to find a matching pixel for each single pixel, in the example schematic of a speckle matching process 600, an N×N pixel speckle descriptor block 654 is selected and centered around each pixel P (x, y) on the preprocessed target speckle image 652, as the 'target speckle descriptor' 642 to be matched. Similarly, with the same pixel as the center, an N×N pixel target template block 662 is selected on the preprocessed reference speckle image of target region as a 'reference matching speckle descriptor' 664.

Compared with the target speckle image 652, the speckle points in the target speckle descriptor 642 will shift left or right with the change of the measurement distance. Therefore, in some examples, a left and right search range 'M' is set, which can be obtained from the distance measurement range. Thereafter, in some examples, the reference matching speckle descriptor 664 will slide left and right in the row direction for a total of 'M' pixels. As a result, there would be 'M+1' reference matching speckle blocks for one target speckle descriptor 642.

$$M = \text{left}_{slide_{num}} + \text{right}_{slide_{num}} \quad [3]$$

Where, in the Formula in Equation [3]:
M is the length of search range of a target speckle descriptor 642;
the left_slide_num 650 is the sliding count of the target speckle descriptor 642 searched left on the reference speckle image; and
the right_slide_num 656 is the sliding count of the target speckle descriptor 642 searched right on the reference speckle image.

In order to improve the search efficiency of matching, some examples describe an improved, optimized search strategy. Extensive tests performed and statistical analysis of these tests have shown that the optimal matched pixels of two adjacent pixels in the target speckle image tends to be remarkably close together and can be found within the M/6 search range. Therefore, in some examples, a threshold may be set to measure a reliability of speckle matching. In a row direction in this scenario, in one example, when the matching rate of the best matching point is greater than the threshold, it may be assumed that the next target speckle descriptor to be matched may not need to do M+1 matching, but may only need the position of the best matching point of the previous one as a starting point. Thus, in this example, only a range of M/6 pixels is needed for sliding left and right, so the number of matched pixels is M/6+1.

In this manner, the matching cost may be reduced by around six times, thereby significantly improving the matching efficiency.

$$\text{search number}(x, y) = \begin{cases} M + 1, & \text{max matching}_{rate} < T \\ \dfrac{M}{6} + 1, & \text{max matching}_{rate} > T \end{cases} \quad [4]$$

Where, in Equation [4]:
T is the threshold for judging whether the best matching result is qualified; and
the max matching_rate is the highest matching rate of the speckle.

Next, according to evaluation criteria that may be used, for example depending upon the respective application, a matching between the target speckle descriptors 642, 654 and a plurality of their reference matching speckle descriptors may be used to find the best matching points of target speckle image. In some examples, the Hamming distance may be selected as the similarity criterion between two speckle descriptors. In some examples, the Hamming distance may be selected as it may utilise the binary encoding data and may be calculated using a LUT approach to greatly improve a calculation efficiency. A skilled artisan will readily understand and appreciate that other similarity criterion, such as a cosine distance, may be used for other applications and implementations.

Specifically, in this example, the number of exclusive OR (XOR) values of the two speckle descriptors is calculated to represent the number of mismatched pixels. According to the results of the Hamming distance, the similarity of the two speckle descriptors can be evaluated by the matching rate, as shown in equation [5], which is:

$$\text{matching rate} = \frac{s1 + s2 - H}{s1 + s2 + H} \quad [5]$$

Where, in Equation [5]:
H denotes the Hamming distance; and
s1 and s2 are the number of pixel values being "1 in the target speckle descriptor and reference matching speckle descriptor respectively.

As understood and appreciated by a skilled artisan, generally the higher the matching rate, the higher the confidence of the matched speckle descriptors.

In addition, to speed up the calculation of matching similarity, the Look-Up-Table (LUT) approach described above in some examples may be introduced to compute the Hamming distance efficiently. In this example, the LUT is adopted to speed up Hamming distance calculation, primarily based on the use of binary encoding compression in the speckle feature extraction, noting that there is no current approach that employs binary code compression. Although examples described herein have binary encoded the speckle image and simplified it to only '0' and '1', the amount of computation of Hamming distance is still not small. However, it may be shown that determining the Hamming distance requires a lot of calculations to count how many '1's are in the results. For instance, each match similarity calculation in a circular way requires N×N accumulations. It is known that an 8-bit binary code can describe a maximum of 256 numeric values, whilst the number of bits being '1' in each value cannot be derived directly. Thus, in some examples, a 256-element LUT is introduced to represent all the results of the number of bits being 1 for the 256 numeric values, as shown in FIG. 7, which illustrates one example of a table 700 that may be used to represent a 'number of bits being '1' in an 8-bit binary value', according to some examples. In this manner, the number of loop accumulation decreases from N×N to (N×N)/8, so that the calculation of matching similarity is eight times faster than that without the introduced LUT approach.

Finally, the transverse difference of the center pixel of the best matching reference speckle descriptor and the center pixel of the target speckle descriptor is the parallax value of the current target pixel to be matched. For a 3D structured light speckle camera/system, it is known that the speckle pattern moves at different distances, and the speckle size and distribution pattern do not change with distance. Therefore, in some examples, a, triangulation principle is adopted to calculate the parallax value to derive the distance value.

Figure 8:
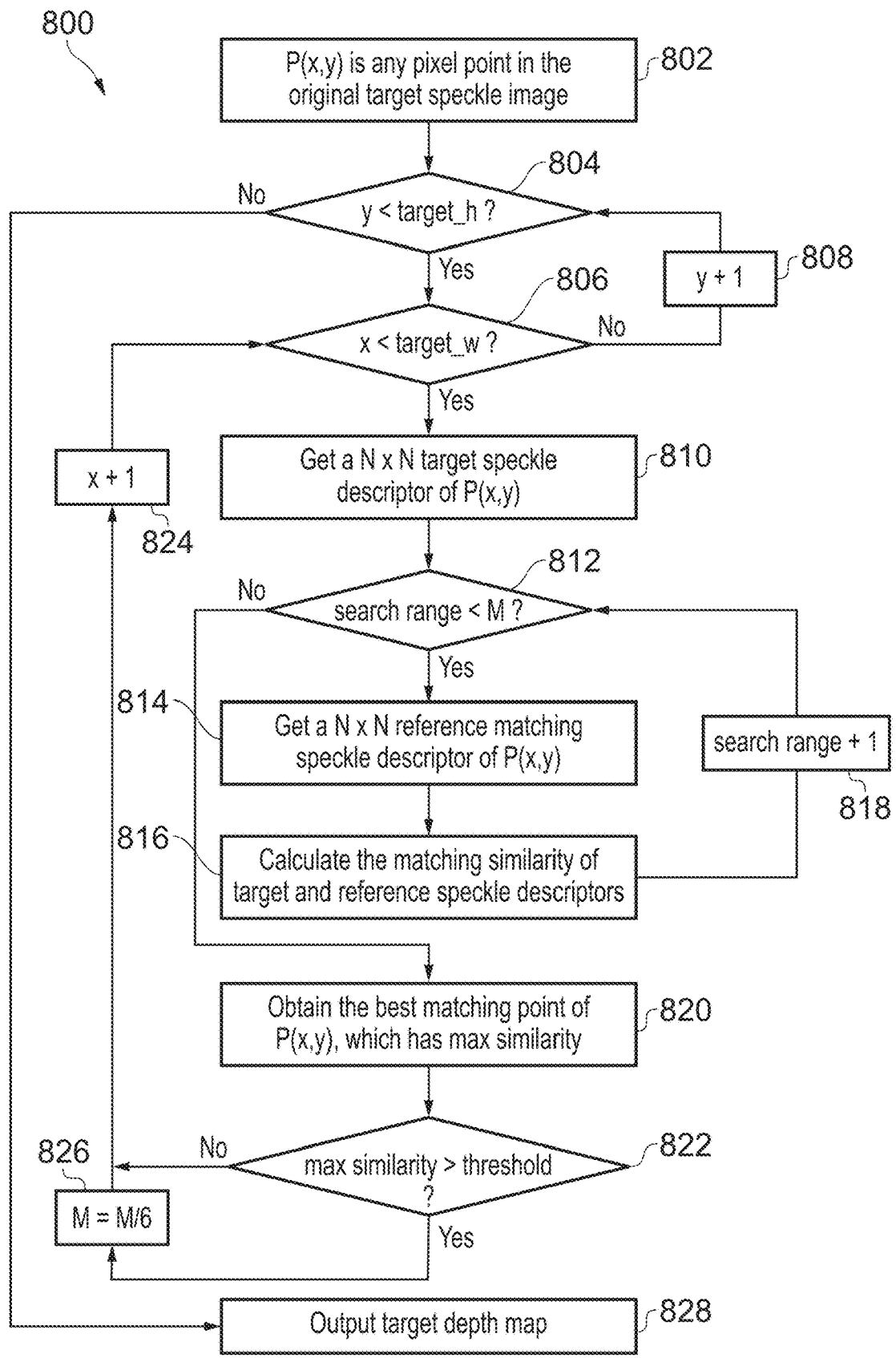
FIG. 8 illustrates one example of a high-level flowchart of a speckle matching and searching process, according to some examples.

Referring now to FIG. 8, one example of a high-level flowchart of a speckle matching and searching process 800 is illustrated, according to some examples. In order to find a matching pixel for each single pixel, each pixel P (x, y) is defined as a respective point on an original preprocessed target speckle image at 802. At 804, a determination is made as to whether 'y' is less than the target height 'h'. If 'y' is not less than the target height 'h' at 804, then the flowchart loops to 828 and the target depth map is output. If 'y' is less than the target height 'h' at 806, then a determination is made as to whether 'x' is less than the target width 'w'. If 'x' is not less than the target width 'x' at 806, then "y' is incremented at 808 and the flowchart loops back to 804.

If 'x' is less than the target width 'x' at 806, then an N×N pixel block of a target speckle descriptor of each pixel P (x, y) is selected at 810. A determination is then made at 812 as to whether a search range is less than 'M'. If the search range is not less than 'M', at 812, the process loops to 820. If the search range is less than 'M', at 812, then an N×N pixel block of a reference matching speckle descriptor of each pixel P (x, y) is selected at 814. At 816, a calculation of the matching similarity of the target speckle descriptor and the reference matching speckle descriptor of a respective pixel P (x, y) is made. The search range is then incremented at 818 and the process loops back to 812.

This process loops until the search range is not less than 'M', at 812, and at 820 the best matching point of a respective pixel P (x, y) that has the maximum similarity is obtained. At 822, a determination is made as to whether the maximum similarity is greater than a threshold. If, at 822, the maximum similarity is not greater than a threshold, the flowchart moves to 824 where 'x' is incremented (as it moves along a row) and the process loops back to 806. Alternatively, if at 822 the maximum similarity is greater than a threshold, M=M/6 at 826 and the flowchart moves to 824 where 'x' is incremented (as it moves along a row) and the process loops back to 806. Thus, in this example, only a range of M/6 pixels is needed (i.e., for sliding left and right, so the number of matched pixels is M/6+1. In this manner, the matching cost may be reduced by around six times, thereby significantly improving the matching efficiency, as illustrated in equation [4].

Improve Long-Distance Depth Decoding Accuracy with Sub-Pixel-Level Processing

In some examples, an approach to improve long-distance depth decoding accuracy with sub-pixel-level (SPL) processing may be adopted. In one example, this SPL processing approach may be adaptive and adopted when the target is far from the camera lens. The SPL operation will increase the calculation resource, but the inventors have recognized and appreciated that this operation is not required for every frame. Therefore, in some examples, a threshold may be added to facilitate adaptively using SPL. In some examples, the threshold may be the size of target image, which may be obtained after multiple tests and analysing statistics. In one example, when the target size is smaller than the threshold, the depth information restoration effect may be strengthened by adaptively using SPL. The SPL processing approach is preferably implemented before a speckle feature extraction pre-processing and binary encoding compression operation. In this instance, there would typically be only a small number of speckle points in the interest area, so the depth change will not be noticeable. However, the current speckle matching result is pixel level, which means that if the depth difference of long-distant objects is less than one pixel unit, it will be considered that the depth has not changed. This is because a depth decoding algorithm is naturally related to the distance. For example, without this feature, the depth decoding algorithm may only be able to restore a satisfactory depth map at a distance of, say, 25-60 cm. However, when adopting this SPL processing feature, the depth estimation/decoding algorithm may be able to support targets at a further distance of 60-90 cm with the same accuracy of depth map.

To improve the depth resolution of the target far from lens, examples described herein provide a SPL processing approach, in which the reference speckle image and the target speckle image before preprocessing are interpolated. In some examples, the reference speckle image and the target speckle image before preprocessing may be interpolated bilinearly. Mathematically, bilinear interpolation is an extension of linear interpolation to an interpolation function with two variables. Hence, the pixel information in the middle of the two pixels can be refined. In some examples, it is envisaged that it is possible to derive the pixel value of a new pixel from the known pixel values within a range of the 'x' and 'y' directions of the pixel.

Since some long-distant speckle spots may be lost, it is possible to deduce the lost speckle spot information through interpolation in order to improve accuracy. In this manner, the speckle feature extraction pre-processing and binary encoding compression operation and speckle matching and optimization acceleration approaches are both based on the sub-pixel-level speckle images. In this manner, when performing speckle matching for long-distant objects, it is possible to achieve a depth parallax value with subpixel accuracy; that is, the unit of depth results is 0.5-pixel. To do this in some examples, a threshold of target size may be given to distinguish whether to use sub-pixel-level processing, which is defined according to the actual application scenario and needs. In this example, the threshold may be set as the size of target image, which may be obtained after performing multiple tests to determine the distance of the object and statistics produced therefrom. For example, when the target size is smaller than the threshold, it may be assumed that the depth information restoration effect needs to be strengthened by SPL, as illustrated in FIG. 9

Figure 9:
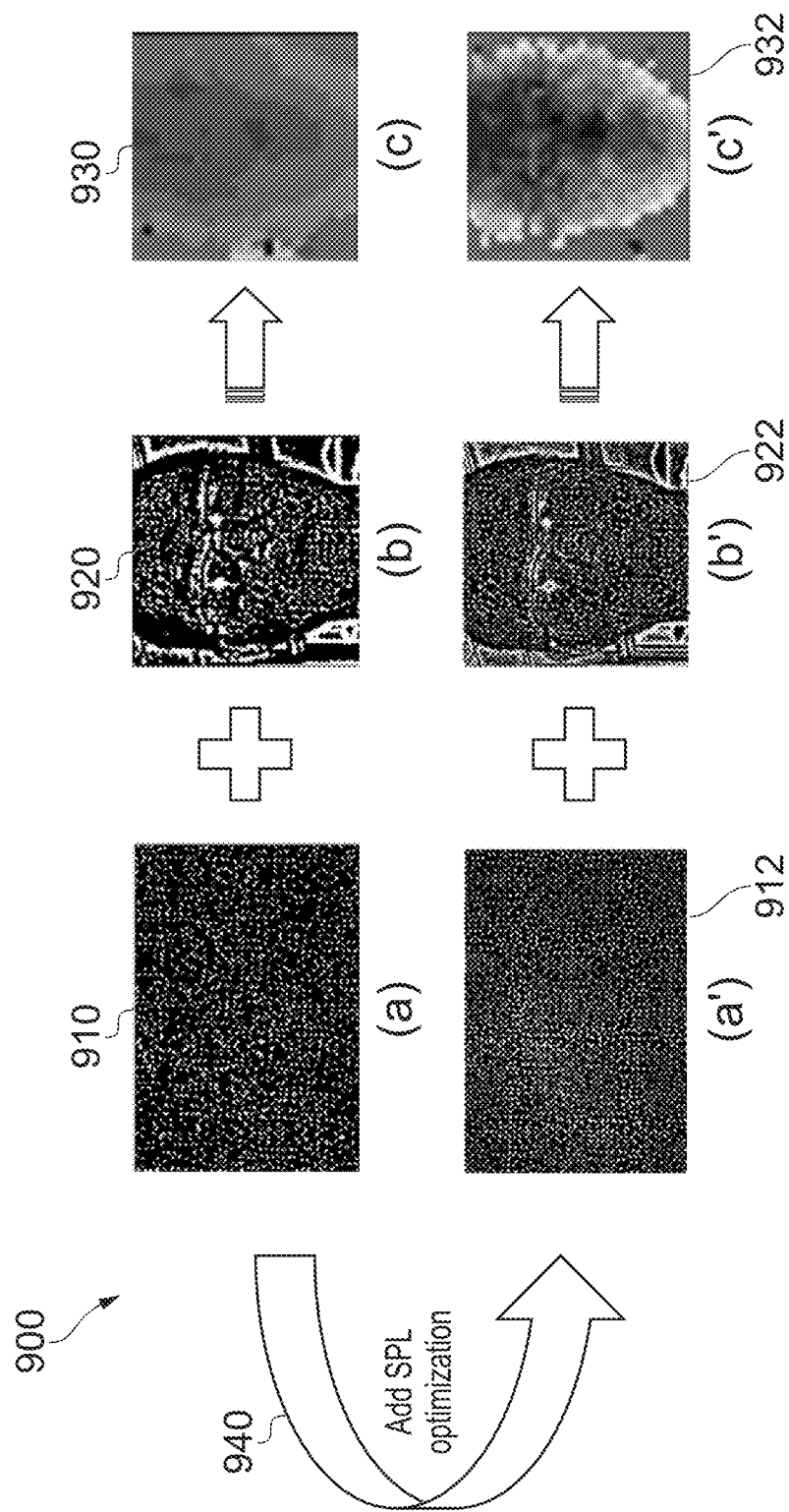
FIG. 9 illustrates one example of exemplary images before and after sub-pixel-level processing according to some examples.

Referring now to FIG. 9, one example of images 900 before and after sub-pixel-level processing 940 is illustrated, according to some examples. Here, the images show: a pre-processed target template 910; a pre-processed target template after SPL optimization 912; a pre-processed target 920; a pre-processed target after SPL optimization 922; a target depth parallax map 930; and a target depth parallax map after SPL optimization 932.

In some examples, it is envisaged that a processor (such as processor 306 in FIG. 3) may perform a local or global adaptive binarization process that searches the LUT memory for speckle features of the stored reference speckle image and match speckle features of the target speckle image with the searched speckle features of the stored reference speckle image when employed in SPL optimization.

Actual Distance Value Calculation

After the above processing, the actual depth value can be calculated according to the speckle projection principle of 3D structured light and the principle of triangulation. The formula of the depth calculation can be represented as:

$$D = \frac{HLf}{Lf \pm H\Delta x} \quad [6]$$

Where: F is the Focal Length of the Camera;
H is the distance between the reference plane and the camera;
L is the distance between the infrared camera and the speckle projector;
Δx is the depth parallax value of the target, which is obtained through above operations; and
D is the distance between the target and the camera-speckle projector surface.

In the foregoing specification, examples have been described with reference to specific example implementations. It will, however, be evident that various modifications and changes may be made therein without departing from the scope as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals. Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also, for example, in one embodiment, the illustrated examples may be implemented as circuitry located on a single integrated circuit or within a same device.

In some examples, the various components within the device having a light source for processing depth information circuits can be realized in discrete or integrated component form, with an ultimate structure therefore being an application-specific or design selection. As the illustrated embodiments may, for the most part, be implemented using electronic components and circuits known to those skilled in the art, details will not be explained in any greater extent than that considered necessary as illustrated below, for the understanding and appreciation of the underlying concepts herein described and in order not to obfuscate or distract from the teachings herein. A skilled artisan will appreciate that the level of integration of a device having a light source for processing depth information circuits or components may be, in some instances, implementation-dependent.

Also, for example, the examples, or portions thereof, may implemented as soft or code representations of physical circuitry or of logical representations convertible into physical circuitry, such as in a hardware description language of any appropriate type. Also, the examples herein described are not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A three-dimensional (3D) structured light camera device comprising:
an infrared (IR) emitting light source configured to illuminate a 3D target object, a speckle emitter, and an IR camera;
a look-up table LUT memory configured to store a reference speckle image of the 3D target object; and
a processor operably coupled to the light source and the LUT memory and configured to:
perform object detection on a target speckle image;
identify a 3D target object area of interest of the target speckle image;
perform a local adaptive binarization process that searches the LUT memory for speckle features of the stored reference speckle image and matches speckle features of the target speckle image with searched speckle features of the stored reference speckle image;
find the matched speckle features of the target speckle image;
perform a morphological operation on the stored reference speckle image and the matched speckle features of the target speckle image that generates a noise-reduced target speckle image,
perform binary encoding compression on the stored reference speckle image and the noise-reduced target speckle image; and
perform a depth value calculation of the 3D target object in response to the binary encoding compression performed on the noise-reduced target speckle image.

2. The 3D structured light camera device of claim 1 wherein the processor configured to perform binary encoding compression on the noise-reduced target speckle image comprises the processor being configured to compress image of eight pixels into one byte of image data.

3. The 3D structured light camera device of claim 2 wherein the LUT memory is configured to store at least one byte of image data of eight pixels speckle features of the stored reference speckle image.

4. The 3D structured light camera device of claim 1 wherein the processor is configured to match one byte of speckle features of the target speckle image with the searched speckle features of the stored reference speckle image.

5. The 3D structured light camera device of claim 1 wherein the processor configured to perform object detection on a target speckle image comprises the processor configured to obtain one or more coordinate parameter(s) of a target bounding box from which the processor is configured to adaptively extract the 3D target object area of interest to process.

6. The 3D structured light camera device of claim 1 wherein the processor is configured to convert the target speckle image and the reference speckle image from a raw red-green-blue, RGB, speckle image to a single-channel greyscale speckle image with a pixel value range between '0' to '255'.

7. The 3D structured light camera device of claim 1 wherein the processor being configured to perform local adaptive binarization comprises the processor configured to separate background information and speckle points of the target speckle image.

8. The 3D structured light camera device of claim 1 wherein the processor being configured to perform local adaptive binarization comprises the processor configured to compare and filter the target speckle image using a threshold that is applied within a set window size.

9. The 3D structured light camera device of claim 8 wherein the processor applies equations:

$$I'(x, y) = \begin{cases} 0, & I(x, y) < T(x, y) \\ 1, & I(x, y) \geq T(x, y) \end{cases} \quad [1]$$

$$T(x, y) = \frac{1}{(2r+1)^2} \sum_{m=-r}^{r} \sum_{n=-r}^{r} I(x+m, y+n) \quad [2]$$

where:
I(x, y) indicates a grey value of any pixel in the original image;
I'(x, y) is a pixel value after local adaptive binarization; and
T(x, y) is a local adaptive binarization threshold.

10. The 3D structured light camera device of claim 9 wherein the local adaptive binarization threshold, is an average value of a plurality of pixels in the window with a grey pixel value I(x, y) identified as a centre of the window and r as a radius of the window.

11. The 3D structured light camera device of claim 1 wherein the processor is configured to first train a speckle matching process for a camera image by first being configured to create reference speckle image.

12. An integrated circuit for a 3D structured light camera device, the integrated circuit comprising a processor according to claim 1.

13. A method for performing a depth value calculation in a three-dimensional (3D) structured light camera device, the method comprising:
- illuminating a 3D target object;
- storing a reference speckle image of the 3D target object;
- performing object detection on a target speckle image of the 3D target object;
- identifying a 3D target object area of interest of the target speckle image;
- performing a local adaptive binarization process comprising searching a look-up table (LUT) memory for speckle features of the stored reference speckle image and matching speckle features of the target speckle image with searched speckle features of the stored reference speckle image;
- finding the matched speckle features of the target speckle image, wherein, in response to the processor finding the matched speckle features of the target speckle image, the method further comprises:
  - performing a morphological operation on the matched speckle features of the target speckle image that generates a noise-reduced target speckle image,
  - performing binary encoding compression on the noise-reduced target speckle image; and
  - performing a depth value calculation of the 3D target object in response to the binary encoding compression performed on the noise-reduced target speckle image.

* * * * *